(12) United States Patent
Dabaghi et al.

(10) Patent No.: US 12,071,072 B2
(45) Date of Patent: Aug. 27, 2024

(54) METHOD AND DEVICE FOR MEASURING A CONTACT OR PROXIMITY WITH A VEHICLE STEERING WHEEL

(71) Applicant: Autoliv Development AB, Vargarda (SE)

(72) Inventors: Youssef-Philippe Dabaghi, Paris (FR); Yosra Dorai, Paris (FR); Adelice Levy, Paris (FR); Nathalie Potel-Charlette, Paris (FR)

(73) Assignee: Autoliv Development AB, Vårgårda (SE)

( * ) Notice: Subject to any disclaimer, the term of this patent is extended or adjusted under 35 U.S.C. 154(b) by 30 days.

(21) Appl. No.: 17/645,376

(22) Filed: Dec. 21, 2021

(65) Prior Publication Data
US 2022/0194295 A1 Jun. 23, 2022

(30) Foreign Application Priority Data
Dec. 21, 2020 (FR) ...................... 2013852

(51) Int. Cl.
| | |
|---|---|
| *B60Q 9/00* | (2006.01) |
| *B60R 16/027* | (2006.01) |
| *G01V 3/08* | (2006.01) |
| *G01V 3/10* | (2006.01) |
| *G08B 21/18* | (2006.01) |

(52) U.S. Cl.
CPC .............. *B60Q 9/00* (2013.01); *B60R 16/027* (2013.01); *G01V 3/088* (2013.01); *G01V 3/10* (2013.01); *G08B 21/182* (2013.01)

(58) Field of Classification Search
CPC . B60Q 9/00; G01V 3/088; G01V 3/10; B60R 16/027; G08B 21/182
USPC .......................................................... 340/686
See application file for complete search history.

(56) References Cited

U.S. PATENT DOCUMENTS

| | | | | |
|---|---|---|---|---|
| 8,301,108 | B2* | 10/2012 | Naboulsi | G08B 21/06 340/576 |
| 10,598,516 | B2* | 3/2020 | Matsumura | G01D 5/24 |
| 11,167,768 | B2* | 11/2021 | Shiraishi | G05D 1/0088 |
| 2012/0191267 | A1* | 7/2012 | Ogawa | G07C 5/0841 701/1 |
| 2015/0123937 | A1* | 5/2015 | Schenkewitz | H03K 17/955 345/174 |
| 2017/0029021 | A1* | 2/2017 | Lee | B62D 15/025 |
| 2017/0174256 | A1* | 6/2017 | Yang | B60T 17/221 |
| 2018/0087929 | A1* | 3/2018 | Matsumura | G01D 5/24 |
| 2018/0106924 | A1* | 4/2018 | Maeda | G01V 3/088 |
| 2018/0152185 | A1* | 5/2018 | Kawahata | H03K 17/962 |

(Continued)

FOREIGN PATENT DOCUMENTS

| | | |
|---|---|---|
| JP | 2019023012 A | 2/2019 |
| WO | 2018/211033 A1 | 11/2018 |

*Primary Examiner* — Zhen Y Wu
(74) *Attorney, Agent, or Firm* — Matthew D. Thayne; Thayne and Davis LLC

(57) ABSTRACT

A method of measuring a user's contact or proximity to a vehicle steering wheel, comprising the steps of measuring the user's contact or proximity to the vehicle steering wheel during a phase of use of the vehicle steering wheel resulting in generating of a measurement signal (SM), storing in a second memory unit at least part of the values of the measurements taken, adjusting the detection threshold (S2M/1M) based on the stored values and/or processing carried out on the stored values.

16 Claims, 4 Drawing Sheets

(56) References Cited

U.S. PATENT DOCUMENTS

2018/0232588 A1\* 8/2018 Matsumura .......... G06V 20/597
2020/0363552 A1\* 11/2020 Menaldo ............... B60R 16/027

\* cited by examiner

METHOD AND DEVICE FOR MEASURING A CONTACT OR PROXIMITY WITH A VEHICLE STEERING WHEEL

CROSS-REFERENCE TO RELATED APPLICATIONS

This application claims priority pursuant to 35 U.S.C. 119(a) to France Patent Application No. 2013852, filed Dec. 21, 2020, which application is incorporated herein by reference in its entirety.

TECHNICAL FIELD OF THE INVENTION

The present invention relates generally to a method and device for measuring contact or proximity with a vehicle steering wheel mounted on a motor vehicle.

BACKGROUND

Methods and devices for measuring contact or proximity with a vehicle steering wheel are known in the prior art, as shown for example in US 2017/0029021 A1. On the other hand, that system can be unreliable, especially if environmental parameters in the passenger compartment vary. Indeed, variations in temperature and humidity can cause variations in measuring contact or proximity of the user to the vehicle steering wheel. The same applies if the user is wearing gloves, or if multiple users are using the same vehicle: the size of the hands or the presence of sweat may vary, and cause variations in measuring the user's contact or proximity to the vehicle's steering wheel.

Such variations can be problematic if postures or usage scenarios must be determined (holding the wheel with the whole hand, four fingers, two fingers, etc.). This classification is important, especially if autonomous driving of the vehicle is possible or permitted: it must be known at all times whether the driver is holding the wheel, under what conditions, and whether that driver can take back control of the vehicle.

JP2019023012A discloses a method of correcting the measurement signal of a vehicle steering wheel detection sensor, the method in particular taking into account values below a threshold representative of a situation in which the steering wheel is not being held by the hand or in contacted with the user.

SUMMARY OF THE INVENTION

One object of the present invention is to address the shortcomings of the aforementioned prior art documents and in particular, first, to provide a method and device for measuring a user's contact or proximity to a vehicle steering wheel that provide reliable and accurate measurements, even if the environmental conditions or the user vary.

To this end, a first aspect of the invention relates to a method of measuring a user's contact or proximity with a motor vehicle steering wheel, the vehicle comprising:
the vehicle steering wheel,
at least one sensor for detecting the user's contact or proximity to the motor vehicle steering wheel, arranged to generate a measurement signal,
a first memory unit storing at least one detection threshold,
a second memory unit arranged to store values of the measurement signal,
a control unit arranged to receive a measurement signal from the detection sensor and to compare the measurement signal with the detection threshold, and to participate in sending an alert message to the user depending on the comparison of the measurement signal with the detection threshold,
the method comprising the steps consisting of:
measuring, with the detection sensor, the user's contact or proximity to the motor vehicle steering wheel during a phase of use of the motor vehicle steering wheel, leading to the generating of a measurement signal,
storing in the second memory unit at least some the values of the measurements taken,
adjusting the detection threshold based on the stored values and/or a processing carried out on the stored values, for example once a predetermined number of stored values has been reached.

The method according to the implementation hereinbefore comprises a step of adjusting at least one detection threshold, which provides dynamic adaptation, depending on the measurements already carried out, or being acquired. As a result, the method makes it possible to adjust the thresholds and therefore the sending of alert messages according to measurements taken when the steering wheel is actually being held by the hand or in contact with the user, and the adjustment is therefore made based on the user, their morphology, the environmental conditions, or even if gloves are being worn when using the steering wheel, and not on the basis of factory-preset criteria.

Another alternative or complementary aspect of the invention may relate to a method of measuring a user's contact or proximity to a motor vehicle steering wheel, the vehicle may comprise:
the vehicle steering wheel,
at least one sensor for detecting the user's contact or proximity to the motor vehicle steering wheel, arranged to generate a measurement signal,
a first memory unit storing at least one detection threshold,
a second memory unit arranged to store values of the measurement signal,
a control unit arranged to receive a measurement signal from the detection sensor and to compare the measurement signal with the detection threshold, and to participate in sending an alert message to the user depending on the comparison of the measurement signal with the detection threshold,
the method may comprise the steps of:
measuring, with the detection sensor, the user's contact or proximity to the motor vehicle steering wheel during a phase of use of the motor vehicle steering wheel, leading to the generating of a measurement signal,
storing in the second memory unit at least part of the values of the measurements taken,
adjusting a distance or deviation between two detection thresholds based on the stored values and/or a processing carried out on the stored values, for example once a predetermined number of stored values has been reached.

According to the implementation hereinbefore, a difference between detection thresholds can be adjusted. Such an update also provides dynamic adaptation, based on the measurements already carried out, or being acquired. As a result, the method makes it possible to adjust the thresholds and therefore the sending of alert messages based on measurements taken when the steering wheel is actually being held by the hand or in contact with the user, and the adjustment is therefore made based on the user, their morphology, the environmental conditions, or even if gloves are being worn when using the steering wheel, and not on the basis of factory-preset criteria The detection thresholds can each be defined statistically to distinguish between user steering wheel handling scenarios.

According to one embodiment, the first and/or second memory unit may be a buffer or any other data storage device (or area of a device) for storing data, making it possible to store data temporarily or permanently.

According to one embodiment, said at least one sensor for detecting the user's contact or proximity to the motor vehicle steering wheel may be a sensor of the capacitive or inductive type.

According to one embodiment, measurements may be stored in the second memory unit if they are excluded from a transitional area. The choice to exclude measurements of transitional phases provides a reliable adjustment and also provides stability in threshold adjustments, which further helps to discriminate between postures or uses without the risk of false detections.

According to one embodiment, a measuring zone may be declared transitional if at least two successive measurements differ by more than 1%, and preferably by more than 0.5%. In particular, in the case of a capacitive sensor, a measuring zone can be declared transitional if at least two successive measurements differ by more than 0.5 pF, and preferably by more than 0.3 pF.

According to one embodiment, the measuring of the user's contact or proximity to the motor vehicle steering wheel during a phase of use of the vehicle steering wheel leading to the generating of a measurement signal may be carried out sequentially in time. In particular, for a given detection sensor, the measuring of the user's contact or proximity to the motor vehicle steering wheel during a phase of use of the vehicle steering wheel, leading to the generating of a measurement signal, may be carried out sequentially in time. In particular, for two separate detection sensors, the measuring of the user's contact or proximity to the motor vehicle steering wheel during a phase of use of the vehicle steering wheel, leading to the generating of a measurement signal for each detection sensor, can be carried out sequentially in time, and can be synchronized or not between the detection sensors.

According to one embodiment, the measuring method may comprise the steps of:
  comparing the adjusted detection threshold to at least one measurement of the measurement signal,
  participating in sending a message or information, for example an alert to the user, based on the comparison of the measurement signal to the detection threshold.

According to one embodiment, the step of comparison with the detection threshold may be carried out:
  on at least one value measured before or after the threshold update, and/or
  on a value, such as a mean or median, calculated from at least one value measured before or after the threshold update.

According to one embodiment, the step of comparing the detection threshold adjusted with at least one measurement of the measurement signal may be followed by a step of categorizing the measured value in a quantity or nature-of-contact category from among a plurality of quantity or nature-of-contact categories. The categorization typically makes it possible to determine whether the user is holding the steering wheel with both hands (palm contact and all fingers of both hands), one hand (palm contact and all fingers of one hand), four fingers, three fingers, etc. . . . . .

According to one embodiment, the measurements may be stored in the second memory unit, if the values of the measurements taken are above a predetermined noise threshold, and/or if they are at least above a predetermined noise value, and/or within a predetermined calibration interval. In other words, only the thresholds corresponding to a sufficiently large measurement signal value are adjusted. Thresholds near zero are not adjusted. For example, one may chose not to adjust thresholds that are less than 30% of a full-scale value of the measurement sensor. In other words, values below a noise threshold are not taken into account. This represents the situation where the steering wheel is not being held in the hand. In such a situation, the signal emitted by the detection sensor is weak, and taking it into account may lead to errors or calculations that are of little or no significance. According to this embodiment, the method excludes the signal values when the steering wheel is not held in the hands. The phases of life or use during which the steering wheel is not being handled or held by the user are not taken into account to adapt the warning thresholds.

According to one embodiment, the measurements may be stored in the second memory unit, if the values of the measurements taken are within a range of values corresponding to a particular steering wheel handling scenario. For example, it is possible to define an interval of values corresponding to handling the steering wheel with one hand or with two hands, for individuals ranging from the 5th percentile to the 95th percentile.

According to one embodiment, the detection threshold may be adjusted based on a processing of the stored values comprising a partitioning into k-means or k-medians. Such data processing makes it possible to discriminate and classify, in a robust and reproducible way, measurements taken in sequence in several classes of values.

According to one embodiment, a number k of partitions can be determined, at least one partition can have a barycenter, and the detection threshold may be adjusted to be:
  within a range of 55% to 15% of said barycenter, preferably 45% to 25% of said barycenter and very preferentially 35% to 25% of said barycenter, or
  within a range of 115% to 155% of said barycenter, preferably 125% to 145% of said barycenter and very preferentially 125% to 135% of said barycenter.

The applicant has found that positioning the threshold offset from the barycenter makes it possible to effectively distinguish the measurements in order to deduce a usage scenario.

According to one embodiment, a number k of partitions can be determined, at least two adjacent partitions each may have a barycenter, and the detection threshold can be adjusted so as to fall within a range of 45% to 85% of the interval going from the smallest barycenter to the largest barycenter of the two adjacent partitions, preferably within a range of 55% to 75% of the interval going from the smallest barycenter to the largest barycenter of the two adjacent partitions, and very preferentially within a range of 75% to 65% of the interval going from the smallest barycenter to the largest barycenter of the two adjacent partitions.

According to the implementation hereinbefore, the threshold is not positioned in the middle of a range separating two barycenters, but rather is shifted towards the weaker of the two barycenters, which makes it possible to effectively distinguish between the measurements in order to deduce a usage scenario. In other words, the sensitivity is increased.

According to one embodiment, the detection threshold may be adjusted within a range of values bounded by a high value and/or a low value. This implementation makes up for a lack of convergence of the successive measures.

According to one embodiment, the measuring method may comprise an initialization phase, comprising the steps of:
  initializing, or resetting, the detection threshold to a base value,
  measuring, with the detection sensor, the user's contact or proximity to the motor vehicle steering wheel during a phase of use of the motor vehicle steering wheel, leading to the generating of a measurement signal,
  storing in the second memory unit the values of the measurements taken, preferably if or when they are above a predetermined initial threshold, until the predetermined number of values is reached. The predetermined initial threshold may correspond to a value representative of a contact or proximity of a minimum area of a user's member (for example at least one finger, two fingers, the thumb and another finger, a whole hand, etc.).

The initialization phase makes it possible to limit the initial classification errors if a number of measurement values is insufficient or conducive to generating a false categorization, and to make the data processing converge as quickly as possible towards stable, reliable values.

According to one embodiment, the storage in the second memory unit of a value of a measurement can only be carried out if a difference between two successive measurements is less than 5%, and preferably less than 3%.

According to one embodiment, storing in the second memory unit a value of a measurement can only be carried out if the value falls within a predetermined confidence interval, for example within a value range of from 50% to 100% of the full scale of the measurement sensor. The confidence interval may be chosen to avoid misinterpretation. For example, it can be statistically predetermined that two-handed steering results in a given measurement signal for 95% or more of the cases, and a choice may be made to take into account only those measurements that are higher than this given measurement signal: it is certain that the user then is holding the steering wheel with both hands.

According to one embodiment, once the predetermined number of stored values is reached, a first detection threshold can be adjusted, and a second detection threshold can be adjusted based on the first detection threshold. According to this implementation, once a particular threshold is adjusted, other thresholds can be derived. For example, one can wait to determine the threshold adjustment for two-handed steering before adjusting the one-handed threshold accordingly, typically by dividing the threshold by 2. This avoids waiting for one-handed steering wheel measurements, and in addition, it can avoid generating incorrect adjustments. In particular, it may be difficult to differentiate a signal value between holding the steering wheel with one large hand, and holding the wheel with two small hands. This is because the value of the one-handed holding measurement signal whose size corresponds to the ninety-fifth percentile can be confused with a two-handed holding measurement signal whose size corresponds to the fifth percentile.

According to one embodiment, the detection threshold can be adjusted solely or exclusively based on the stored values and/or a processing of the stored values. In other words, only measurement data are used to adjust the thresholds. No further information is required, and the process is autonomous and uses only the sensor measurements, which are then classified according to the adjusted threshold.

According to one embodiment,
  the vehicle steering wheel can comprise two or more sensors for detecting a user's contact or proximity to the vehicle steering wheel,
  wherein the steps of measuring a contact or proximity, of storing measurement values of and of adjusting the detection threshold are carried out for each sensor, preferably independently, for example in a sequential, staggered or simultaneous manner. This makes it possible to distinguish a left hand from a right hand, and to propose adjusted and reliable thresholds, even if only one hand is wearing a glove, or if only one hand is exposed to a hot or cold air current.

According to one embodiment, the measuring method can be computer-implemented.

A second aspect of the disclosure relates to a driver assistance system for a vehicle, which may comprise:
  at least one sensor for detecting the user's contact or proximity to the motor vehicle steering wheel, arranged to generate a measurement signal,
  a first memory unit storing at least one detection threshold,
  a second memory unit arranged to store values of the measurement signal,
  a control unit arranged to implement the method according to the first aspect of the disclosure.

A third aspect of the disclosure relates to a motor vehicle, which can comprise the assistance system according to the second aspect of the disclosure.

DESCRIPTION OF THE FIGURES

Other characteristics and advantages of the present invention will become more apparent upon reading the detailed description of an embodiment of the invention, which is provided by way of example but in no manner limited thereto, and illustrated by the attached drawings, in which.

DETAILED DESCRIPTION OF THE INVENTION

Figure 1:
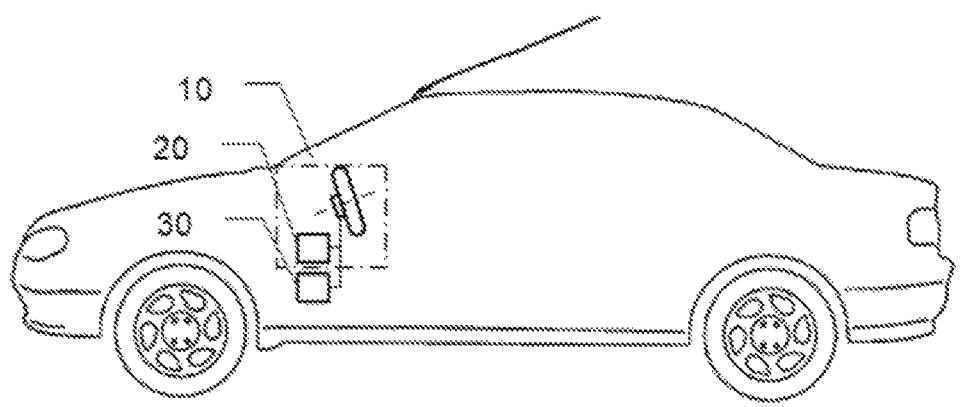
FIG. 1 shows a vehicle with a steering wheel comprising a device for measuring a user's contact or proximity to the vehicle steering wheel.

FIG. 1 shows a vehicle equipped with a vehicle steering wheel 10 having a rim 11, and equipped with a device for measuring 20 a user's contact or proximity to the vehicle steering wheel 10. The measuring device 20 is mounted in the steering wheel 10 (although represented separately in FIG. 1).

The measuring device is arranged to detect contact or proximity between a user and the steering wheel. Typically, the measuring device 20 is used to detect whether the driver is touching the steering wheel, or even under what conditions (one-handed, two-handed, pinching the rim with two fingers, three fingers, etc.).

For this purpose, the vehicle further comprises, for example, a central electronic control unit 30 connected to the measuring device 20 and arranged to send an alert message to the driver depending on whether or how the steering wheel is being held as detected by the measuring device, and/or to decide whether autonomous driving or a degree of autonomous driving is compatible with how the steering wheel is being held as detected by the measuring device 20.

In practice, the central electronic control unit 30 can be connected to a secondary control unit 25 (visible in FIG. 2) of the measuring device 20 and may receive categorized information about how the vehicle steering wheel 10 is being held. In particular, it can be provided that the measuring device 20 can send processed information that the steering wheel is being held with two hands, one hand, etc. . . .

Figure 2:
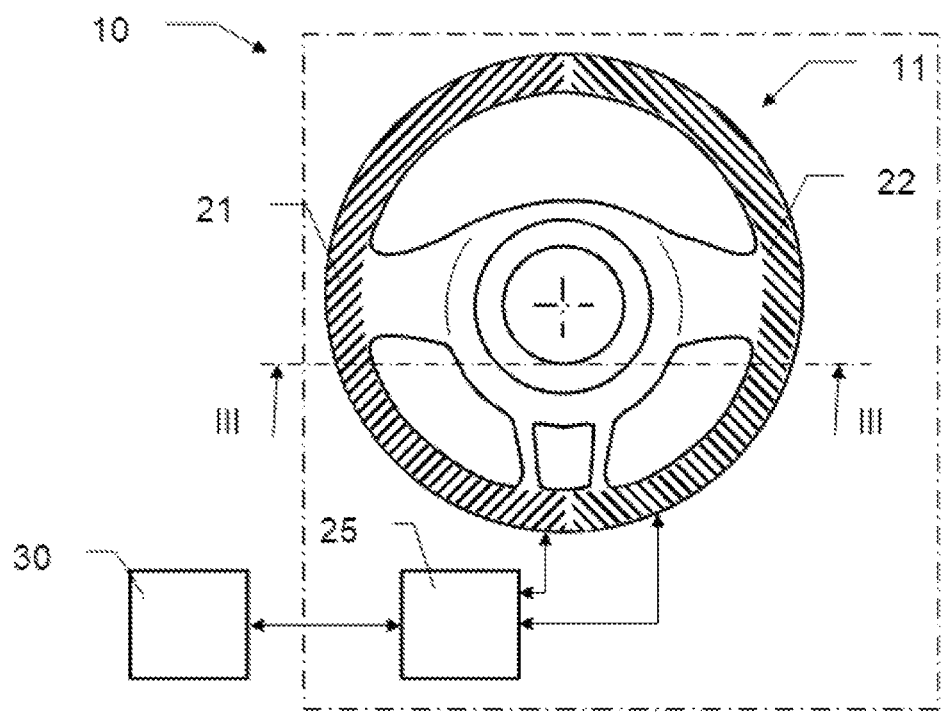
FIG. 2 shows the vehicle steering wheel of FIG. 1, comprising a device for measuring a user's contact or proximity to the vehicle steering wheel.
Figure 3:
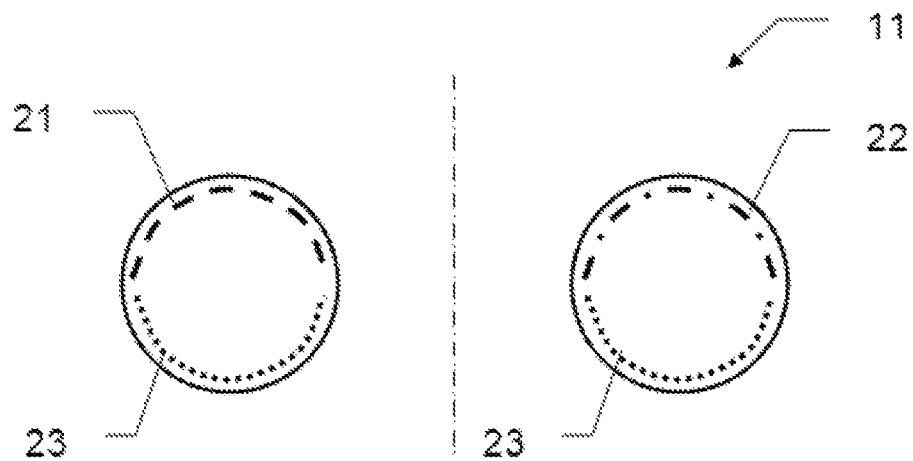
FIG. 3 shows a simplified cross-section of a first alternative of the rim of the vehicle steering wheel of FIG. 2.
Figure 4:
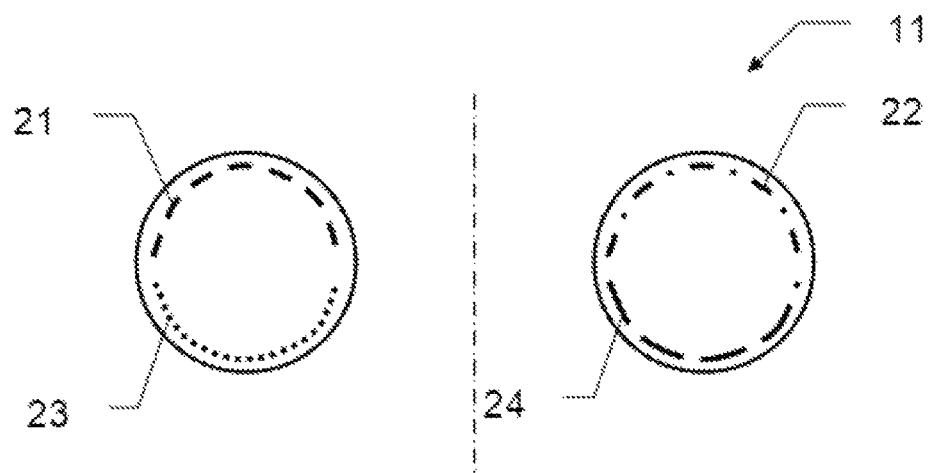
FIG. 4 shows a simplified cross-section of a second alternative of the rim of the vehicle steering wheel of FIG. 2.

For this purpose, and as shown in FIGS. 2, 3 and 4, the vehicle steering wheel 10 is equipped, in particular in the area of the rim 11, with detection sensors 21, 22, 23, 24, each of which can detect the user's contact or proximity to the vehicle steering wheel 10, and each of which is arranged to generate a measurement signal, which is sent to a secondary control unit 25 in the vehicle steering wheel 10 for processing. Indeed, without being shown, the secondary control unit 25 preferably mounted on the steering wheel typically comprises a processing unit, a first memory unit storing at least one detection threshold, a second memory unit arranged to store values of the measurement signals.

FIG. 3 shows a cross-section along axis of a first alternative of the rim 11, where the right- and left-hand sides of the rim 11 are shown. On the left-hand side, a first detection sensor 21 is positioned on the upper part, that is opposite the driver. Similarly, a second detection sensor 22 is positioned on the upper part of the rim 11 on the right-hand side. Finally, a third detection sensor 23 is positioned on the lower part of the rim 11, on the left and on the right. A "mirror" configuration can be provided, that is two separate right/left sensors in the lower part, and a single sensor in the upper part. In other words, according to this implementation of FIG. 3, the rim 11 is equipped with three separate detection sensors: right/left at the top or bottom of the rim 11, and a common detection sensor on the opposite part.

FIG. 4 shows the cross-section along axis of a second alternative of the rim 11, where the right- and left-hand sides of the rim 11 are shown. In this implementation, four detection sensors 21, 22, 23, 24 are provided, two per left or right half of the rim 11, that is one detection sensor 21 or 22 at the upper part of the rim 11 in FIG. 4, and one detection sensor 23 or 24 at the lower part of the rim 11 in FIG. 4.

Other configurations may be provided with more or fewer detection sensors (typically one or two sensors), which cover more or less of the rim 11, and/or the spokes of the vehicle steering wheel 10. Other electrical or electronic equipment, such as a heater, display or control of infotainment devices, may be provided on the vehicle steering wheel 10 or the rim 11. In any case, the detection sensors may be of the capacitive type, typically arranged under a decorative sheath of the rim 11. Typically, a current or voltage is applied to the detection sensors to derive a capacitance that varies based on the driver's contact or proximity to the vehicle steering wheel 10.

As explained hereinbefore, the signal from each detection sensor is received by the secondary control unit 25 and the following steps can, for instance, be provided to evaluate the information and to deduce from it how the driver is holding the vehicle steering wheel 10: amplification, and/or filtering, and/or smoothing, and/or sampling, and/or digitizing, and/or storing values, and/or comparing with a threshold, and/or categorizing the holding based on the comparison, and/or sending the processed signal or the categorization of the measurement taken to the central electronic control unit 30 . . . .

Figure 5:
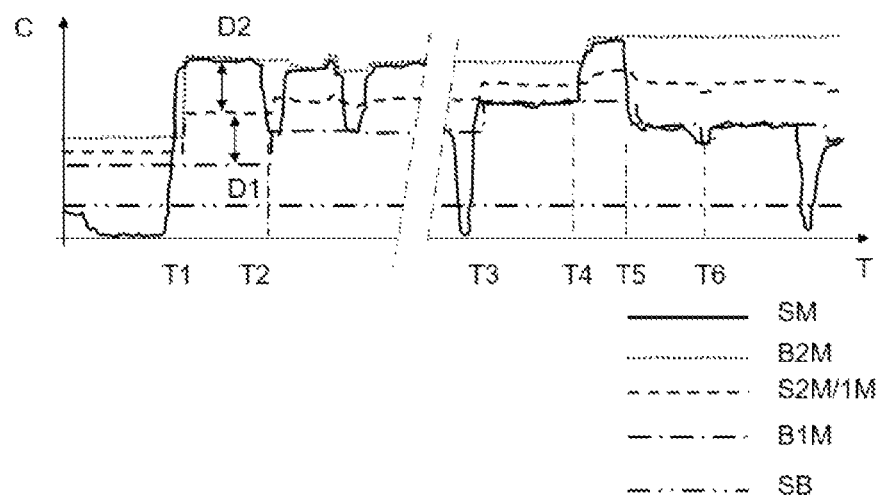
FIG. 5 shows a graph showing contact or proximity measurements carried out over time with the device of FIG. 1, and the change in alert thresholds adjusted by a measuring method, based on the measurements taken.

FIG. 5 shows an example of a measurement signal over time, and the processing carried out by the method according to the disclosure.

In detail, the representation over time is shown as:
- a continuous line for the measurement signal SM of one of the rim detection sensors 11 (for example sensor 23 in FIG. 3),
- a small dotted line for the calculation of the barycenter B2M (or the average) of the measurement values when the rim is being held with both hands,
- a dashed line for the threshold S2M/1M applied to categorize a measurement indicating that the steering wheel is being held with two hands, or with one hand,
- a hybrid line for the calculation of the barycenter B1M (or of the average) of the measurement values when the rim is being held with one hand
- a mixed hybrid line to indicate a minimum threshold of consideration SB, or noise threshold.

Before the time T1, the measurement signal SM is weak or nil, so it can be deduced that the driver is not holding the rim 11 at the detection sensor in question. As shown in the graph, the signal is below the minimum threshold of consideration SB, the values are ignored and not considered for a threshold adjustment. Indeed, taking into account measurement values when the steering wheel is not being held by the hand may mean making inappropriate and/or insignificant threshold adjustments. Furthermore, only taking into account values above the minimum threshold of consideration SB ensures that subsequent adjustments will truly reflect the steering wheel handling/holding situation. The following parameters can influence the signal values: the user's morphology (whether they have small or large hands), or the conditions of use (the user is wearing gloves), or the environmental conditions (the air is very dry or very humid), or the temperature.

At time T1 however, the measurement signal SM increases, exceeds the minimum threshold of consideration SB and then the threshold S2M/1M, indicating that the steering wheel is being held with both hands. As soon as the measurement signal SM is above the minimum threshold of consideration SB and stabilizes (that is two successive measurements differ by less than 3% for example), we then see that the barycenter B2M (of the values indicating that the steering wheel is being held with both hands) is updated, a little after T1. For this purpose, the measurement values of the measurement signal SM can be stored in the second memory unit of the secondary control unit 25, to be used when the processing unit of the secondary control unit 25 updates the threshold S2M/1M. For example, it is possible to do a mean, a rolling mean, a k-means calculation of the values between T1 and T2 as soon as they are stable.

Note that as soon as the barycenter B2M (two-handed hold) is updated after T1, the threshold S2M/1M is updated by being substantially increased, to be placed at a distance D2 from the barycenter B2M, and at a distance D1 from the barycenter B1M (one-handed hold).

To make the distinction effective, it is possible to choose to offset the threshold S2M/1M with respect to the interval between the barycenter B2M and the barycenter B1M. In particular, it is possible to choose:

0.45(B2M−B1M)<D2<0.85(B2M−B1M)

Therefore giving 0.65(B2M−B1M)<D1<0.15(B2M−B1M)

And more preferentially:

0.65(B2M−B1M)<D2<0.75(B2M−B1M)

Therefore giving 0.35(B2M−B1M)<D1<0.25(B2M−B1M)

At time T2, the measurement signal SM drops below the updated threshold S2M/1M and briefly stabilizes, which makes it possible to update the values of the barycenter B1M of the measurement signal values when the steering wheel rim 11 is being held with one hand. Note that just after T2, while the barycenter B1M is being updated, the barycenter B2M is not updated, but instead the threshold S2M/1M is adjusted to be substantially increased, to reflect the update of the barycenter B1M.

Then, between T2 and T3, the steering wheel is successively being held with two hands or one, with slight updates of the barycenters and the threshold.

However, at time T3, the measurement signal SM, which has fallen below the minimum threshold of consideration SB and below the threshold S2M/1M, rises to a level higher than the previous values for one hand, while remaining below the threshold S2M/1M. This may be due to a change in posture, temperature, or humidity, and the values are close to the threshold S2M/1M, which could lead to misinterpretation, the steering wheel being held by one hand.

However, due to the update being stopped during the period when the signal is below the threshold SB, but then resumed and carried out automatically, it can be noted that the barycenter B1M is quickly recalculated and increases, causing the threshold S2M/1M to be adjusted to provide a significant difference between the barycenter B1M and the threshold S2M/1M. The distinction between one-handed and two-handed holding remains reliable.

At time T4, the steering wheel is again held with both hands, and again the measurement signal SM is higher than the values between T1 and T2, which again causes an update of the barycenter B2M as soon as the values are stabilized, and the threshold S2M/1M is adjusted accordingly. It can be noted that between T3 and T4, the barycenter B2M is not updated, and between T4 and T5, the barycenter B1M is not updated, since the values of the measurement signal SM at these times belong to the other category.

Finally, at time T6, a decrease in the values of the measurement signal SM in the one-handed holding range can be noticed, which automatically causes a decrease in the barycenter B1M and thus in the threshold S2M/1M, even though the barycenter B2M does not vary.

The updating of the barycenters B2M and B1M over time and the subsequent adjustment of the threshold S2M/1M ensures that the threshold is dynamically adapted to the driver (their morphology, glove wearing, etc.) and to the conditions in the vehicle (temperature, humidity, etc.) in order to clearly and effectively distinguish one particular steering wheel grip style from another.

It may also be noted that once the threshold S2M/1M is adjusted, provision may be made to adjust another threshold, such as a four-finger or three-finger holding threshold, by applying a predetermined conversion rate. This has the advantage of not waiting to have measurements in the area under consideration to adjust the threshold. This can also avoid making threshold adjustments with low values (that is those with a greater relative measurement error), or whose categorization can be hazardous due to range overlap (three fingers of a large hand may be confused with four fingers of a small hand).

Figure 6:
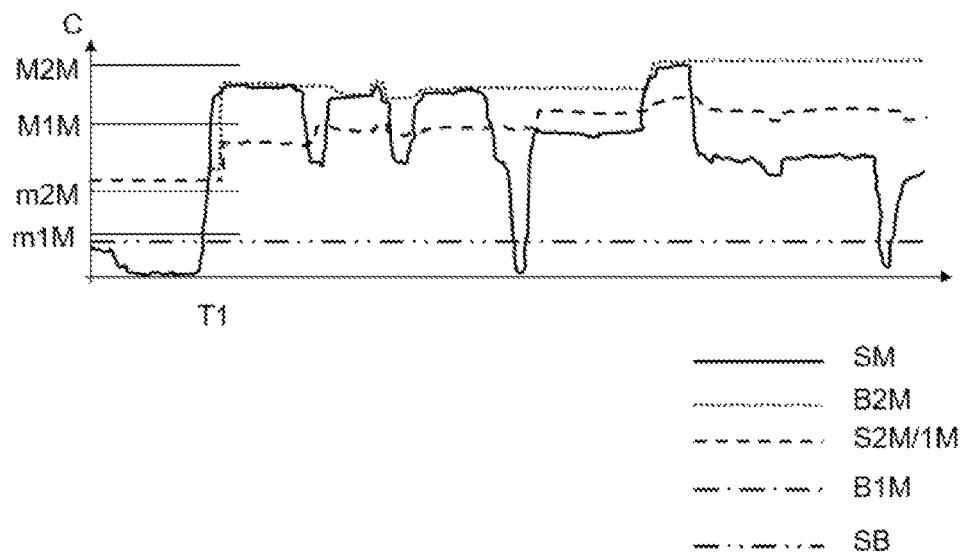
FIG. 6 shows a graph showing an initialization phase of the measuring method adjusting the thresholds as shown in FIG. 5; and, FIG. 7 shows an alternative or supplement to the adjustment of the measurement thresholds in FIG. 5.

FIG. 6 shows a phase of initialization of the thresholds in order to avoid categorizing measurement values into a wrong assignment or class. This allows for faster convergence towards an optimal characterization of the measurements.

Indeed, FIG. 6 shows values delimiting the categories, assignments or classes of steering wheel grips. For example, measurement values for a two-handed steering wheel grip will be between the maximum M2M and the minimum m2M (these values can be defined based on statistics on the population to cover, for example, 95%, or from the 5th percentile to the 95th percentile). Then, measurement values of a one-handed steering wheel grip will be between the maximum M1M and the minimum m1M.

It may then be noted that a measurement value between M1M and m2M is equivocal, and cannot be assigned to one-handed steering or two-handed steering.

In order to avoid updating the barycenter in the wrong category, it is intended that at the beginning of the use of the vehicle (after a cold start or a long period of inactivity), predetermined thresholds can be applied and not adjusted until the values of the measurement signal SM are within a "confidence" interval. For example in FIG. 6, it can be foreseen to wait for values of the measurement signal SM to be in the interval between M1M and M2M, where it is sure that the steering wheel can only be held with two hands. Thus, before T1, the threshold S2M/1M is not adjusted, and only begins to be adjusted when stable measurements are taken between M1M and M2M (and thus also above the threshold SB). This initialization phase may comprise, once the threshold S2M/1M (by nature, the largest) has been adjusted, an automatic adjustment of all other thresholds with one or more predetermined conversion rates, even if no measurement has been taken in the ranges of values considered.

Figure 7:
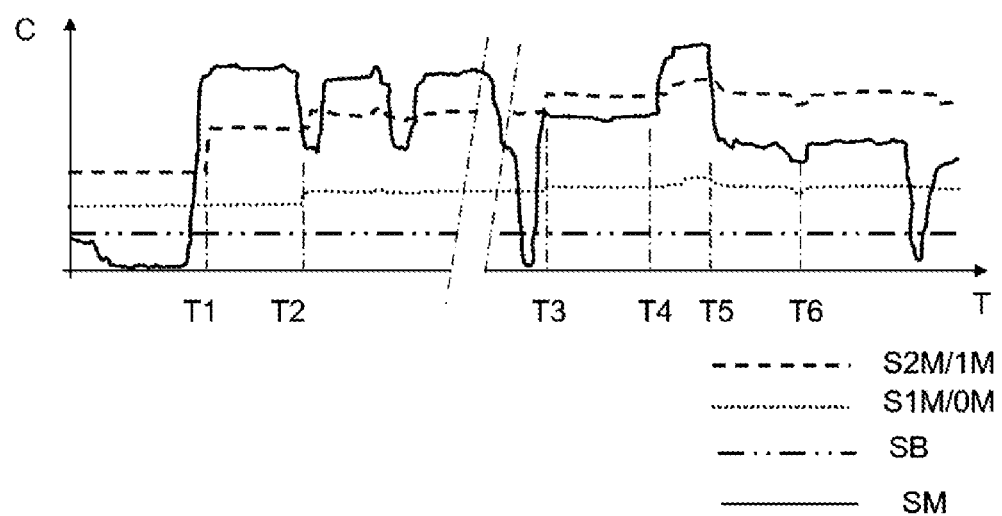

FIG. 7 shows an example of the measurement signal over time, and of the processing carried out by the method according to the disclosure, in the case where several detection thresholds are applied and monitored.

In detail, the representation over time is shown as:
- a solid line for the measurement signal SM which is the same as that in FIGS. 5 and 6,
- a large dashed line for the threshold S2M/1M applied to categorize a measure indicating that the steering wheel is being held with two hands, or with one hand (identical to FIG. 5),
- a small dashed line for a threshold S1M/0M applied to categorize a measurement indicating that the steering wheel is being held with only one hand, or with no hands (that is not being held at all, or being held with one or two fingers)
- a mixed double line for the noise threshold SB below which measurements are not taken into account and/or not stored in the computational storage units.

During the start-up sequence described in FIG. 5, we saw that it was possible to update the threshold S2M/1M. In the context of this situation, shown in FIG. 7, one can also choose to update the threshold S1M/0M, so that the difference between these two thresholds can vary, as seen for example at time T1, T2 or T3.

It can be foreseen to update the threshold S1M/0M only if the threshold S2M/1M exceeds a certain value, as is done at time T2 (the threshold S1M/0M does not vary before T2), and/or to update the threshold S1M/0M by applying a reduction factor with respect to the threshold S2M1M, as is done after time T2. We thus have two evolutionary detection thresholds, updated according to the values of the steering wheel grip which correspond to the morphology of the driver, the temperature and/or humidity in the passenger compartment, etc., which improves the relevance of the detection thresholds. Note that each threshold can be updated according to specific rules, simultaneously or independently of the other.

In any case, the update is preferably made on the basis of measurements taken while the occupant is touching the steering wheel, and not while the steering wheel is not being gripped at all, thus ensuring that the signal taken into account is significantly above zero or a noise threshold below which it is not known whether the steering wheel is being gripped or not. This prevents calculations from being made on values whose proportions are small and highly variable.

It will be understood that different modifications and/or improvements which are obvious for the person skilled in the art may be made to the different embodiments of the invention described in the present description without departing from the scope of the invention.

The invention claimed is:

1. A method of measuring a user's contact or proximity to a vehicle steering wheel,
the vehicle comprising:
the vehicle steering wheel,
at least one detection sensor for detecting the user's contact or proximity to the vehicle steering wheel, arranged to generate a measurement signal,
a first memory unit storing at least one detection threshold,
a second memory unit arranged to store values of the measurement signal,
a processing unit arranged to receive a measurement signal from the at least one detection sensor and to compare the measurement signal with the at least one detection threshold, and to participate in sending an alert message to the user based on the comparison of the measurement signal with the at least one detection threshold,
the method comprising:
measuring, with the at least one detection sensor, the user's contact or proximity to the motor vehicle steering wheel during a phase of use of the vehicle steering wheel, leading to the generating of a measurement signal,
storing in the second memory unit at least part of values of measurements taken by the at least one detection sensor, if the values of the measurements taken by the at least one detection sensor are above a predetermined noise threshold,
adjusting the detection threshold by an amount, wherein the amount is dynamically adjusted based on the stored values and/or a processing carried out on the stored values such that adjustment of the detection threshold provides dynamic adaption based on, at least in part, the measurements taken by the at least one detection sensor.

2. The measuring method according to claim 1, wherein the measurements are stored in the second memory unit if the measurements are excluded from a transitional zone.

3. The measuring method according to claim 2, wherein a measuring zone is declared transitional if at least two successive measurements differ by more than 5%.

4. The measuring method according to claim 1, comprising the steps of:
comparing the adjusted detection threshold to at least one measurement of the measurement signal,
participating in sending an alert message to the user, based on the comparison of the measurement signal to the detection threshold.

5. The measuring method according to claim 4, wherein the step of comparing the detection threshold adjusted with at least one measurement of the measurement signal is followed by a step of categorizing the measured value in a quantity or nature-of-contact category from among a plurality of quantity or nature-of-contact categories.

6. The measuring method according to claim 1, wherein the detection threshold is adjusted based on a processing of the stored values comprising a k-means partitioning.

7. The measuring method according to claim 6, wherein a number k of partitions is determined, wherein at least two adjacent partitions each have a barycenter, and wherein the detection threshold is adjusted so as to fall within a range of 45% to 85% of the interval going from the smallest barycenter to the largest barycenter of the two adjacent partitions, preferably within a range of 55% to 75% of the interval going from the smallest barycenter to the largest barycenter of the two adjacent partitions and very preferentially within a range of 75% to 65% of the interval going from the smallest barycenter to the largest barycenter of the two adjacent partitions.

8. The measuring method according to claim 1, wherein the detection threshold is adjusted within a range of values limited by a high value and/or a low value.

9. The measuring method according to claim 1, comprising an initialization phase, comprising the steps of:
initializing the detection threshold to a base value,
measuring, with the at least one detection sensor, the user's contact or proximity to the motor vehicle steering wheel during a phase of use of the vehicle steering wheel, leading to the generating of a measurement signal,
storing in the second memory unit the values of the measurements taken until a predetermined number of values is reached.

10. The measuring method according to claim 9, wherein the storage in the second memory unit of a value of a measurement is only carried out if a difference between two successive measurements is less than 5%.

11. The measuring method according to claim 9, wherein the storage in the second memory unit of a value of a measurement is only carried out if the value falls within a predetermined confidence interval.

12. The measuring method according to claim 9, wherein, once the predetermined number of stored values is reached, a first detection threshold is adjusted, and wherein a second detection threshold is adjusted on the basis of the first detection threshold.

13. The measuring method according to claim 1,
the vehicle steering wheel comprising two sensors for detecting the user's contact or proximity to the vehicle steering wheel,
wherein the steps of measuring contact or proximity, storing measurement values, and adjusting the detection threshold are carried out for each sensor.

14. A driver assistance system for the driver of a vehicle, comprising:
   at least one sensor for detecting the user's contact or proximity to the vehicle steering wheel, arranged to generate a measurement signal,
   a first memory unit storing at least one detection threshold,
   a second memory unit arranged to store values of the measurement signal,
   a control unit arranged to implement the method according to claim 1.

15. The assistance system according to claim 14 in combination with a motor vehicle.

16. A method of measuring a user's contact or proximity to a vehicle steering wheel,
the vehicle comprising:
   the vehicle steering wheel,
   at least one sensor for detecting the user's contact or proximity to the vehicle steering wheel, arranged to generate a measurement signal,
   a first memory unit storing at least one detection threshold,
   a second memory unit arranged to store values of the measurement signal,
   a processing unit arranged to receive a measurement signal from the detection sensor and to compare the measurement signal with the at least one detection threshold, and to participate in sending an alert message to the user based on the comparison of the measurement signal with the at least one detection threshold,
the method comprising:
   measuring, with the detection sensor, the user's contact or proximity to the motor vehicle steering wheel during a phase of use of the vehicle steering wheel, leading to the generating of a measurement signal,
   storing in the second memory unit at least part of values of the measurements taken, if the values of the measurements taken are above a predetermined noise threshold,
   adjusting the at least one detection threshold based on the stored values and/or a processing carried out on the stored values, wherein the at least one detection threshold is adjusted based on a processing of the stored values comprising a k-means partitioning.

* * * * *